US012653756B2

(12) United States Patent
Tugurian et al.

(10) Patent No.: US 12,653,756 B2
(45) Date of Patent: Jun. 16, 2026

(54) DOSE PACKAGING SYSTEM FOR MEDICATION AND METHOD OF STORING DOSE THEREIN

(71) Applicant: Sarepta Therapeutics, Inc., Cambridge, MA (US)

(72) Inventors: Harry Tugurian, Savannah, GA (US); Neema Pourian, Chicago, IL (US); Jason C. Campbell, Chicago, IL (US); Nathan P. Foster, Chicago, IL (US); José L. Padilla, Cicero, IL (US)

(73) Assignee: Sarepta Therapeutics, Inc., Cambridge, MA (US)

(*) Notice: Subject to any disclaimer, the term of this patent is extended or adjusted under 35 U.S.C. 154(b) by 41 days.

(21) Appl. No.: 18/750,827

(22) Filed: Jun. 21, 2024

(65) Prior Publication Data

US 2025/0387299 A1 Dec. 25, 2025

(51) Int. Cl.

*B65D 25/10* (2006.01)
*A61J 1/03* (2023.01)
*A61J 1/14* (2023.01)

(52) U.S. Cl.

CPC ............... *A61J 1/1425* (2015.05); *A61J 1/03* (2013.01)

(58) Field of Classification Search

CPC ........ B65D 25/108; B65D 1/36; B65D 71/70; B65D 5/5038; B65D 77/0446; B01L 9/06; B01L 2200/025; B01L 2200/185; B01L 2200/18; B01L 2200/023; B01L 2300/041;

(Continued)

(56) References Cited

U.S. PATENT DOCUMENTS 5,057,282 A * 10/1991 Linder ................. B65D 5/5038 220/507
5,325,987 A * 7/1994 Alpern ................. B65D 81/022 206/370

(Continued)

FOREIGN PATENT DOCUMENTS

FR 3050441 A3 10/2017
JP D1567971 S 1/2017

(Continued)

OTHER PUBLICATIONS

NL 1037645 Google Machine Translation, accessed Sep. 12, 2025 (Year: 2011).*

(Continued)

*Primary Examiner* — King M Chu
(74) *Attorney, Agent, or Firm* — Foley & Lardner LLP

(57) ABSTRACT

A package for a dose includes an outer box including a housing including a bottom panel and one or more side wall defining an open segment in the perimeter of the bottom panel. A flap is coupled to the bottom panel and encloses the one or more sidewalls when the outer box is in a closed position. A lid is coupled to the housing. The packaging includes least one tray assembly disposed within the housing including a tray defining an interior region, a support partitioning the interior region into a plurality of slots, and a cover sheet. The cover sheet includes a main sheet overlaying the support and a plurality of openings aligned with at least a subset of the plurality of slots extending through the main sheet to allow one or more slots of the subset to receive a container.

20 Claims, 11 Drawing Sheets

(58) Field of Classification Search
CPC ... B01L 2300/0809; B01L 9/54; A61J 1/1425; A61J 1/03
USPC .................................................. 206/443, 370
See application file for complete search history.

(56) References Cited

U.S. PATENT DOCUMENTS

| | | | | |
|---|---|---|---|---|
| 8,727,124 B2 * | 5/2014 | Franciskovich | B01L 9/06 206/370 |
| D774,388 S | 12/2016 | Xia | |
| D845,788 S | 4/2019 | O'Neill | |
| 2015/0166212 A1 * | 6/2015 | Wissner | B65D 1/36 206/565 |

FOREIGN PATENT DOCUMENTS

| | | | | |
|---|---|---|---|---|
| JP | D1623577 S | | 2/2019 | |
| NL | 1037645 C2 | * | 7/2011 | B65D 5/325 |
| TW | D198174 S | | 6/2019 | |
| TW | D211570 S | | 5/2021 | |

OTHER PUBLICATIONS

Unpublished, U.S. Appl. No. 29/948,673, filed Jun. 21, 2024, Sarepta Therapeutics, Inc.

"Category: Package Innovation Design Sub-Category: E-Commerce," PAC Global Awards, retrieved from https://www.pac-awards.com/2024-nominees-package-innovation-design on May 20, 2024, 7 pages.

International Search Report and Written Opinion Issued in PCT Application No. PCT/IB2024/060010 dated, Mar. 17, 2025.

TW Office Action and Search Report issued in TW Application No. 113305308 issued May 23, 2025, with English Translation.

* cited by examiner

DOSE PACKAGING SYSTEM FOR MEDICATION AND METHOD OF STORING DOSE THEREIN

FIELD

The present disclosure pertains to storage of dose products (e.g., a unit dose product), and more particularly to packaging allowing for such storage, and methods of storing dose products in packaging.

BACKGROUND

Pharmaceutical products can be administered by healthcare professionals in different dose forms, such as in unit dose form (e.g., a single dose). Dose forms can be stored in dose containers, which are non-reusable containers intended to hold a quantity of drug for administration. Drug products packaged for dose dispensing are provided to allow delivery of a specified dose at the time of administration, which can be in an institutional setting such as a hospital, for example.

SUMMARY

The present disclosure sets forth exemplary packaging for a dose product (e.g., a unit dose) that facilitates preservation of product integrity until the point of administration. Further, such exemplary packaging provides ease of use for healthcare professionals, in addition to facilitating visual inspection, proper handling, and dose tracking.

One aspect of proper administration of medication is accurate dosing. Healthcare professionals routinely employ manual visual counting to verify accurate dispensing and administration of medication. Visual counting may include visually inspecting and counting individual dosages to verify that the quantity dispensed amounts to an indicated dose. The present disclosure sets forth exemplary packaging configurations providing visibility of individual doses to a user, thus promoting management of drug administration.

One embodiment relates to a package (a package instance, a packaging unit, a product package) for a pharmaceutical product in the form of a dose container (e.g., a unit dose container). The dose container includes an outer box including a housing. The housing includes a bottom panel, one or more sidewalls extending upwards from the bottom panel and surrounding a portion of a perimeter of the bottom panel. The one or more sidewalls have a first edge and a second edge defining an open segment in the perimeter of the bottom panel. The housing includes a flap coupled to the perimeter of the bottom panel and spanning the open segment. The flap extends between the first edge and the second edge, enclosing the one or more sidewalls when the outer box is in a closed position. The outer box further includes a lid coupled to a portion of the one or more sidewalls at an open end of the housing. The lid is configured to receive the one or more sidewalls and hold the flap against the first edge and the second edge when the outer box is in the closed position. The package further includes at least one tray assembly disposed within the housing when the outer box is in the closed position. The at least one tray assembly includes a tray defining an interior region, a support disposed within the interior region and partitioning the interior region into a plurality of slots, and a first cover sheet disposed within the interior region. The first cover sheet includes a main sheet overlaying the support, and a first plurality of openings aligned with at least a subset of the plurality of slots extending through the main sheet to allow one or more slots of the subset to receive a container.

In at least one embodiment, a number of the plurality of slots is greater than a number of the first plurality of openings by two or more; and slots of the plurality of slots not aligned with the first plurality of openings are adjacent one another.

In at least one embodiment, the at least one tray assembly includes a handle coupled to an exterior side of the at least one tray assembly.

In at least one embodiment, the first plurality of openings is arranged in sets of 1-10 openings.

In at least one embodiment, the plurality of openings is arranged in a layout forming a grid.

At least one embodiment includes an envelope disposed within the housing behind the at least one tray assembly.

In at least one embodiment, the at least one tray assembly includes two or more tray assemblies stacked within the housing.

In at least one embodiment, a tray assembly of the at least one tray assembly includes a second cover sheet comprising the main sheet and a second plurality of openings, the second cover sheet having at least one of a different number of openings or a different arrangement of openings relative to the first cover sheet.

One embodiment relates to a dose container (e.g., a unit dose container) including a predetermined number of containers associated with a prescribable dose and packaging configured to contain the predetermined number of containers. The packaging includes an outer box. The outer box includes a housing. The housing includes a bottom panel and one or more sidewalls extending upwards from the bottom panel and surrounding a portion of a perimeter of the bottom panel. The one or more sidewalls define a top opening in the housing and a side opening in the housing. The housing includes a flap coupled to the perimeter of the bottom panel and covering the side opening when the outer box is in a closed position. The outer box includes a lid coupled to the housing proximate the top opening, the lid configured to receive and engage the housing and cover the top opening when the outer box is in the closed position. The packaging includes at least one tray assembly disposed within the housing when the outer box is in the closed position. The at least one tray assembly is removable from the housing through at least one of the top opening and the side opening when the outer box is in an open position. The at least one tray assembly includes a tray defining an interior region, a support disposed within the interior region and partitioning the interior region into a number of slots greater than or equal to the predetermined number of containers, and a first cover sheet within the interior region. The first cover sheet includes a first predetermined number of openings associated with the predetermined number of containers. A plurality of the openings align with respective slots and each opening is configured to hold one container.

In at least one embodiment, the dose containers are vials.

In at least one embodiment, an envelope assembly is disposed within the housing, and the envelope assembly includes an envelope; and a number of alcohol swabs disposed within the envelope, the number of alcohol swabs corresponding to the predetermined number of containers.

In at least one embodiment, the envelope assembly includes an insert configured to include instructions associated with administration of the dose.

In at least one embodiment, a tray assembly is stacked above another tray assembly of the at least one tray assembly.

In at least one embodiment, a tray assembly includes a second cover sheet comprising a second predetermined number of openings different from the first predetermined number of openings.

In at least one embodiment, the number of slots is greater than the predetermined number of openings by two or more; and slots un-exposed by an opening in the cover sheet are proximate one another.

In at least one embodiment, a perforated tear strip is disposed between the lid and the housing.

In at least one embodiment, the at least one tray assembly further comprises a handle coupled to an exterior side of the tray assembly.

One embodiment relates to a method of storing a dose (e.g., a unit dose) in a dose container. The method includes determining a number of containers corresponding to a prescribable dose. The method includes providing an outer box. The outer box includes a housing including a bottom panel, one or more sidewalls extending upwards from the bottom panel and surrounding a portion of a perimeter of the bottom panel. The one or more sidewalls have a first edge and a second edge defining an open segment in the perimeter of the bottom panel. The housing includes a flap coupled to the perimeter of the bottom panel and spanning the open segment, the flap extending between the first edge and the second edge and enclosing the side wall when the outer box is in a closed position. The outer box includes a lid coupled to a portion of the one or more sidewalls at an open end of the housing, the lid configured to receive the one or more sidewalls and hold the flap against the first edge and the second edge when the outer box is in the closed position. The method includes placing at least one tray assembly within the housing. The at least one tray assembly includes a tray defining an interior region and a support disposed within the interior region and partitioning the interior region into a number of slots greater than or equal to the number of containers for corresponding to the dose. The slots are arranged in rows. The at least one tray assembly includes a cover sheet disposed within the interior region and overlaying the support. The cover sheet includes a number of openings corresponding to the number of containers, at least one of the openings aligning with a slot and configured to hold one container, the openings exposing at least a subset of the slots.

BRIEF DESCRIPTION OF THE FIGURES

Before turning to the figures, which illustrate certain embodiments in detail, it should be understood that the present disclosure is not limited to the details or methodology set forth in the description or illustrated in the figures. It should also be understood that the terminology used herein is for the purpose of description only and should not be regarded as limiting.

Figure 1:
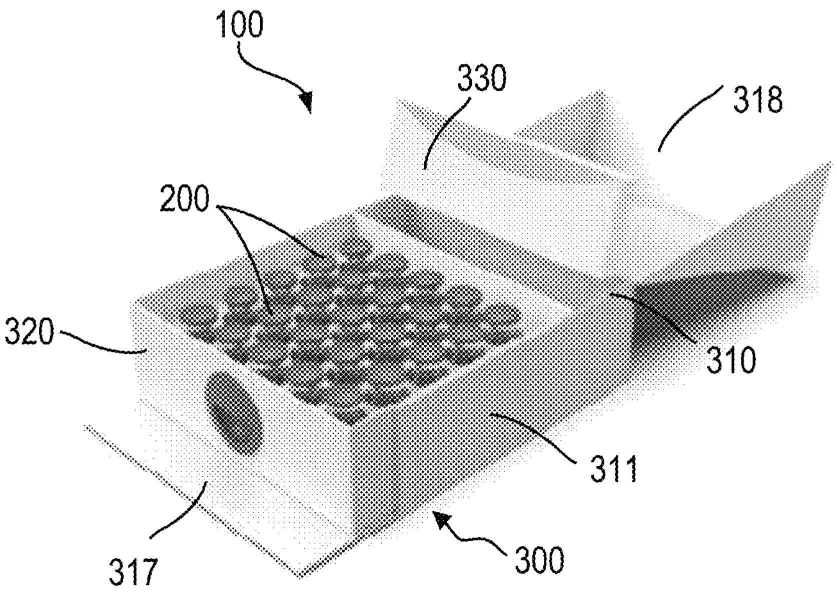
FIG. 1 shows a dose container with an outer box in an open position, according to one embodiment.

Reference is made to the accompanying drawings throughout the following detailed description. In the drawings, similar symbols typically identify similar components, unless context dictates otherwise. The illustrative implementations described in the detailed description, drawings, and claims are not meant to be limiting. Other implementations may be utilized, and other changes may be made, without departing from the spirit or scope of the subject matter presented here. It will be readily understood that the aspects of the present disclosure, as generally described herein, and illustrated in the figures, can be arranged, substituted, combined, and designed in a wide variety of different configurations, all of which are explicitly contemplated and made part of this disclosure.

DETAILED DESCRIPTION

Embodiments described herein relate to packaging for pharmaceutical dose product, such as a unit dose product (although doses that may be used in connection with the exemplary containers herein are not limited to unit doses). A unit dose is a single dose of a drug (e.g., pharmaceutical formulation, drug product, medication, medicament, etc.) to be administered to a patient in need thereof. A unit dose may be provided in the form of a single packaged dose or may be allocated among multiple, smaller units each delivering a fractional dose, or portion of a dose, wherein the multiple units collectively provide the single dose to be administered. Accordingly, a unit dose may be administered via one or more individual, pre-measured units that collectively deliver a prescribable dose in accordance with prescription requirements. The doses may be administered by healthcare professionals (e.g., physicians, nurses, nurse practitioners, physician's assistants, pharmacists, medical technologists, etc.) in a clinical, or hospital setting. Some fractionated dosing regimens are tailored to an individual patient's specific needs (e.g., accounting for factors such as age, weight, etc.) and require packaging custom to a specified dosage.

The embodiments described herein improve usability for healthcare professionals, by organizing individual fractional doses of a drug in a manner that prioritizes visibility and access. Improved visibility allows healthcare professionals to more reliably, efficiently, and accurately verify the required dosage for patients, perform a visual count to confirm that the dosage unit has the sufficient amount of containers of the fractional dose to provide a prescribed dose, as well as visually inspect the containers of the drug prior to administration. The likelihood of error in dispensing the drug is reduced, thereby improving patient outcomes. Ease of handling and administration of the drug by healthcare professionals is provided, streamlining the drug administration process and improving workflow efficiency, particularly in busy environments.

The embodiments described herein also provide customizable configurations to accommodate various treatment regimens, dosage requirements, dosage forms, and patient needs. Packaging can be easily tailored to diverse requirements, needs, and preferences of healthcare professional, healthcare facilities, and patient populations.

In addition, the embodiments described herein reduce the number of packaging configurations and reduce the number of components utilized across packaging stock keeping units (SKUs). As such, the embodiments described herein provide benefits with respect to preparing dosage kit packages, in terms of case of customization, manufacturing complexity, cost reduction, operational efficiency, inventory management, and sustainability.

Referring to FIGS. 1-5 generally, a dosage unit 100 of a drug includes a predetermined number of containers 200 (e.g., vials, tubes, bags, bottles, cartridges, cylinders, ampoules, droppers, syringes, flacons, vessels, etc.) of a fractional dose of the drug, and packaging 300. In some embodiments, the containers 200 contain a portion of a unit dose. In some embodiments, the containers 200 are made of glass, plastic, or metal or any combination thereof. In some embodiments, the containers include closures (caps, stoppers, plungers, rubber/elastomeric closures, etc.) for covering the containers 200. The drug may be administered variously, such as by oral administration (e.g., solid and liquid oral dosage forms such as tablets, capsules, liquids, elixirs, powders, etc.), topical administration (e.g., creams, ointments, gels, patches, sprays, etc.), and injection administration (e.g., intravenous, intramuscular, subcutaneous, intradermal, etc.). In some embodiments, the containers 200 are vials containing ELEVIDYS® (Sarepta Therapeutics, Inc., Cambridge MA), a suspension for intravenous infusion. The predetermined number of containers 200 is associated with a prescribable dose (e.g., a dosing requirement) for a patient, such as a unit dose. In some embodiments, the predetermined number of containers 200 can be associated with a specific patient, medical condition, treatment plan, and/or the like. For example, the predetermined number of containers 200 can be at least one container 200 and less than 80 containers, or less than 100 containers 200. In some embodiments, the containers 200 are organized in the packaging 300 such the containers 200 can be easily inspected and accessed. In some embodiments, the containers 200 are organized in the packaging 300 such that the quantity of containers 200 in the packaging 300 can be easily determined by a healthcare professional.

The containers 200 are securely contained within the packaging 300 (e.g., secondary packaging, etc.). The packaging 300 is configured to store, protect, and/or organize the containers 200. For example, the packaging 300 safeguards the containers 200 from external factors, such as light, moisture, air, contaminants, as well as protects against physical damage during handling, transportation, and storage. In some embodiments, the containers 200 must be stored in an ultracold (e.g., between −90° to −60° C.) environment, such as an ultra-low temperature freezer, and thawed to room temperature prior to administration. In such embodiments, the packaging 300 is made of a material selected to withstand ultracold temperatures and fluctuations between ultracold temperatures and ambient temperatures. In some embodiments, the packaging 300 is made of paperboard (e.g., chipboard, solid bleached sulfate (SBS), coated unbleached kraft (CUK), etc.). In some embodiments, the packaging 300 is made of a plastic such as high-density polyethylene (HDPE) or polypropylene (PP), glass, and/or aluminum. In some embodiments, the packaging 300 is made of cardboard. In some embodiments, the packaging 300 may be specifically sized to hold a specific container and/or can be configured to receive different types of containers.

Figure 13:
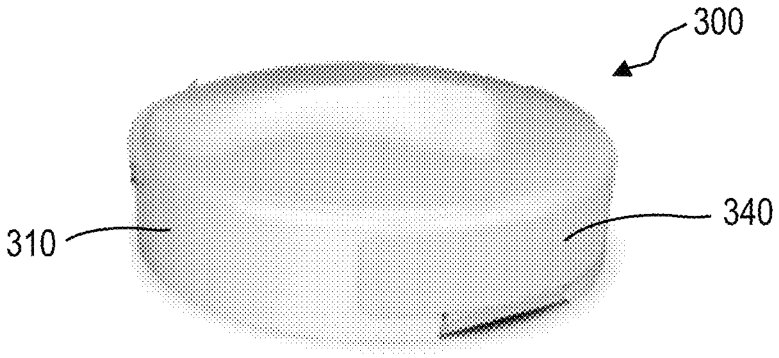
FIG. 13 shows a dose container with an outer box in a closed position, according to one embodiment.
Figure 14:
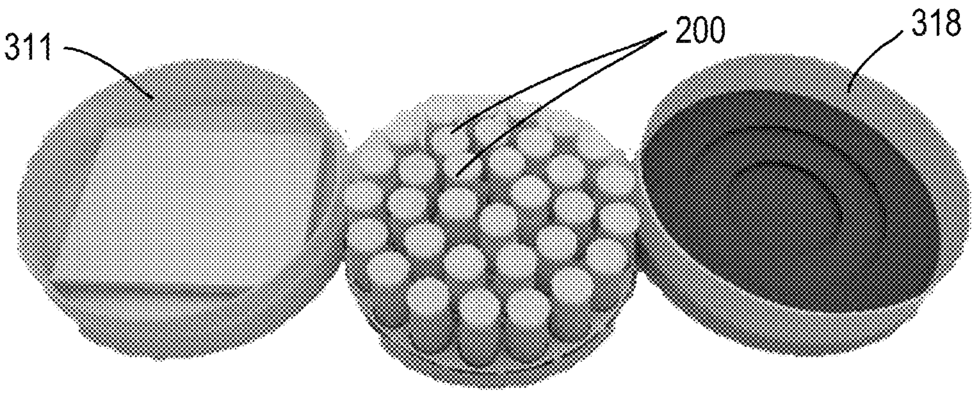
FIG. 14 shows the dose container of FIG. 11, with the outer box in an open position.
Figure 16:
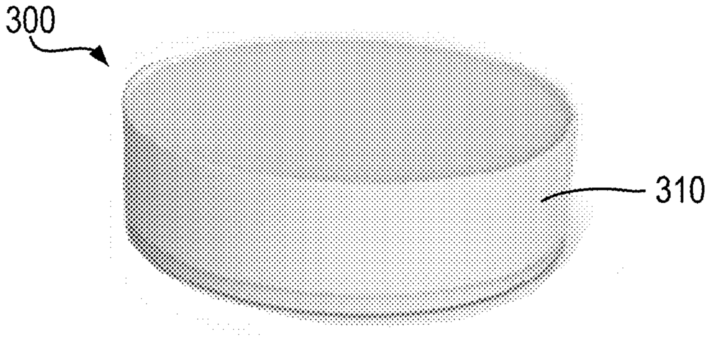
FIG. 16 shows packaging for a dose container with an outer box in a closed position, according to one embodiment.
Figure 17:
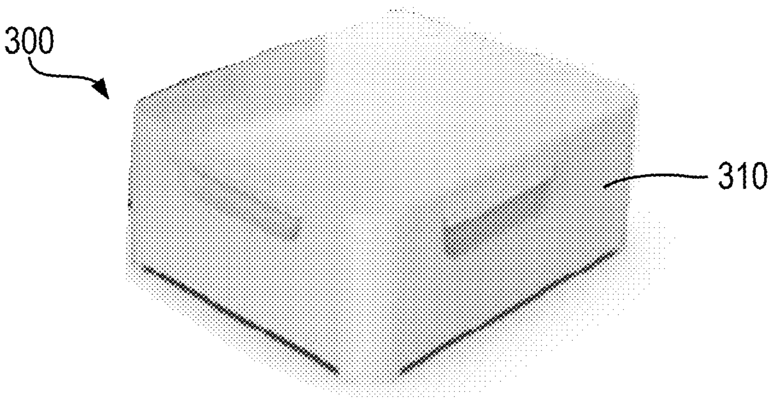
FIG. 17 shows packaging for a dose container with an outer box in a closed position, according to one embodiment.

The packaging 300 includes an outer box 310 and at least one tray assembly 320. The outer box 310 is configured to provide structural support for containing containers 200 and/or to protect the containers 200 in an internal volume. The outer box 310 includes a housing 311 and a lid 318. The housing 311 includes a bottom panel 312 and one or more sidewalls 313 extending upwards from the bottom panel 312. In some embodiments, the housing 211 has a rectangular shape. In some embodiments, the housing 311 has a cylindrical shape, for example, as shown in FIGS. 13 and 16. In some embodiments, the housing 311 has an irregular shape. In some embodiments, dimensions of the housing 311 are selected to minimize footprint, and allow easier storage. In some embodiments, dimensions of the housing 311 are selected to accommodate standard shelving, or other storage structures, found in medical environments. In some embodiments, the bottom panel 312 and the one or more sidewalls 313 are integrally formed. In some embodiments, the one or more sidewalls 313 can be a separate surface coupled to (e.g., adhered, fastened, etc.) the bottom panel 312. The one or more sidewalls 313 surround a portion of a perimeter of the bottom panel 312 and have a first edge 314 and a second edge 315 defining an open segment in the perimeter of the bottom panel 312.

Figure 3:
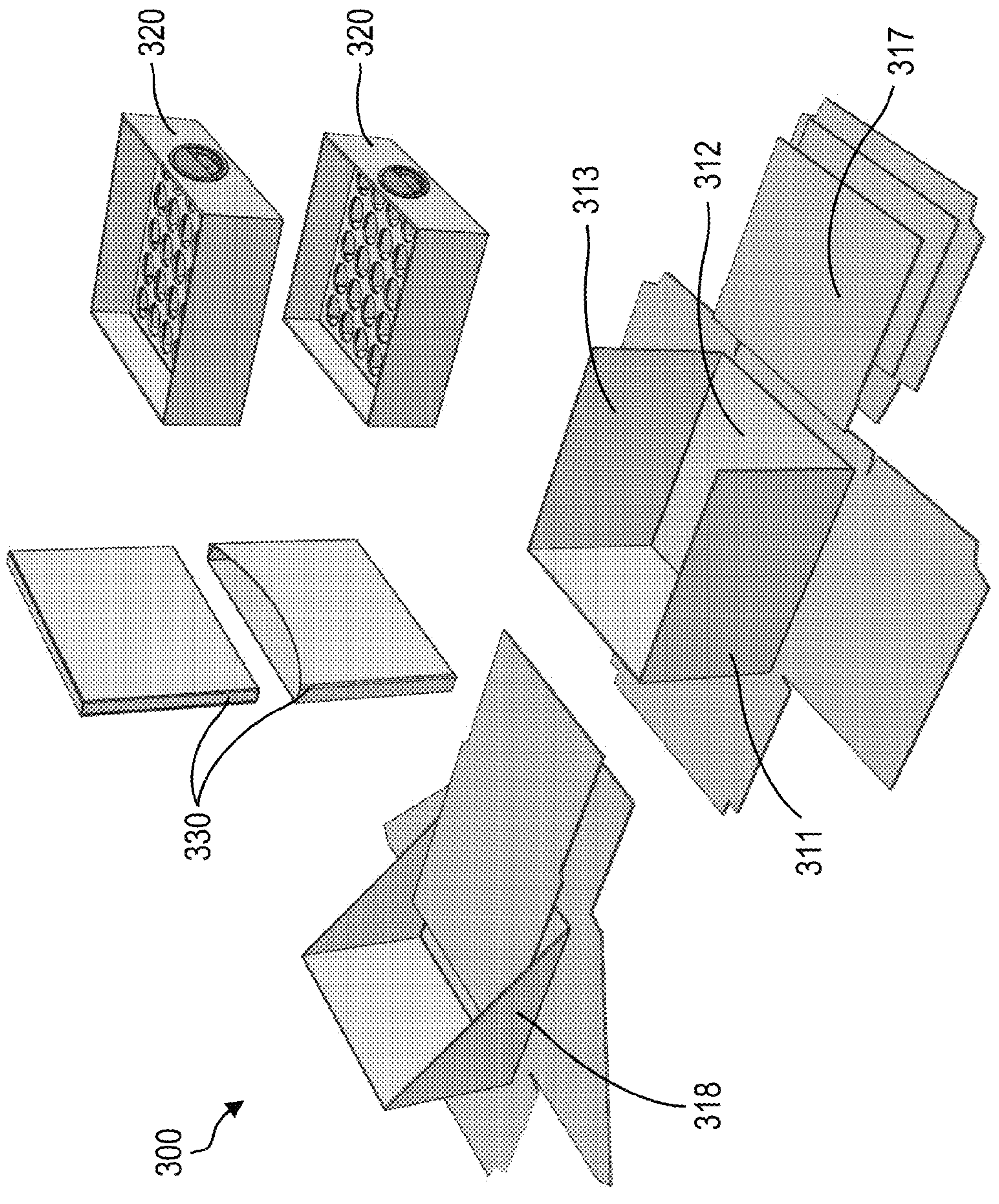
FIG. 3 shows an exploded view of packaging for a dose container, according to one embodiment.
Figure 15:
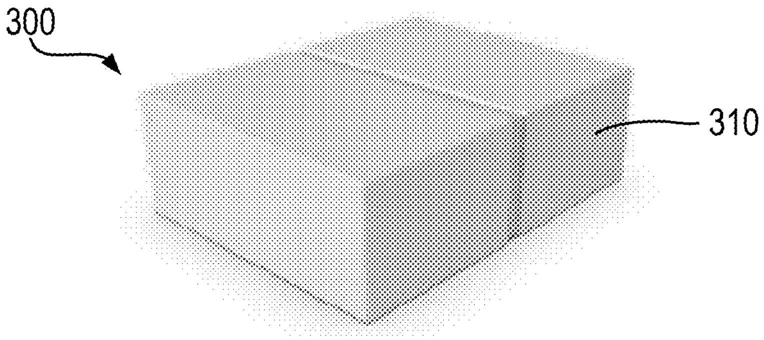
FIG. 15 shows packaging for a dose container with an outer box in a closed position, according to one embodiment.

The housing 311 includes a flap 317 coupled (e.g., in a hinged manner) to the perimeter of the bottom panel 312. In some embodiments, the flap 317 is integrally formed with the bottom panel 312 and/or the one or more sidewalls 313. In some embodiments, the flap 317 spans the open segment. The housing 311 further includes a lid 318 coupled (e.g., in a hinged manner) to a portion of the one more sidewalls 313 at an open end of the housing 311. In some embodiments, the lid 318 includes a surface that receives printable indicia with information associated with the dosage unit 100. In some embodiments, the lid 318 includes a surface that receives printable indicia with information such as the name of the patient, the name, strength, quantity and physical description of the medication, directions for use, cautionary statements, storage instructions, and/or the like. In some embodiments, as shown in FIG. 3, the housing 311 and the lid 318 further include reinforcements, such as a backing or substrate, to provide additional rigidity to the packaging 300. In some embodiments, the lid 318 is not coupled to the housing 311, for example, as shown in FIGS. 11-17. In some embodiments, the lid 318 is removed from the housing 311 in a horizontal direction, for example, as shown in FIG. 15. In some embodiments, the lid 318 may include a securing feature, such as a tab, or release, that must be engaged to release the lid 318 from the housing 311.

Figure 2:
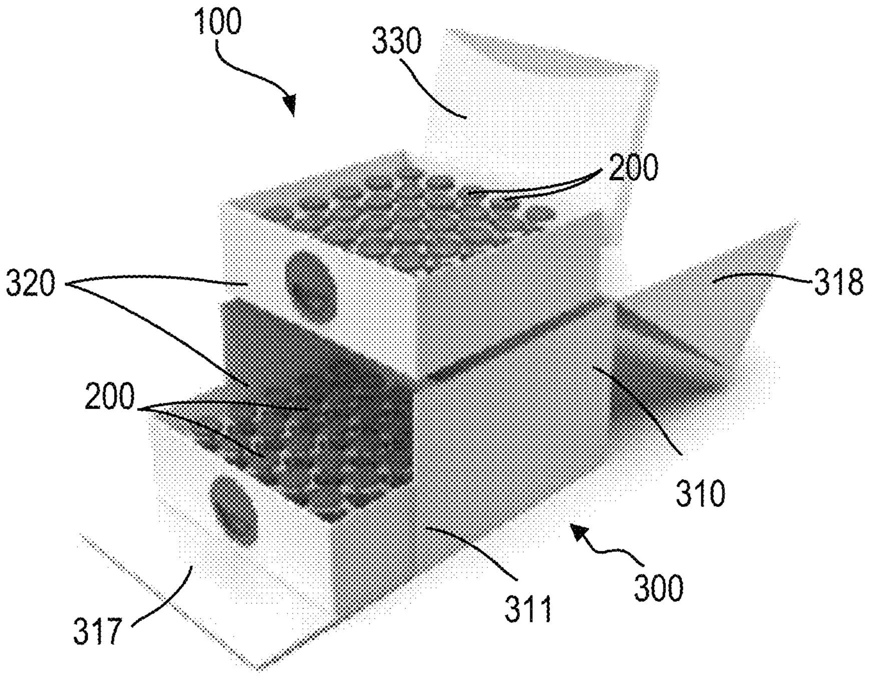
FIG. 2 shows a dose container with an outer box in an open position, according to another embodiment.
Figure 4:
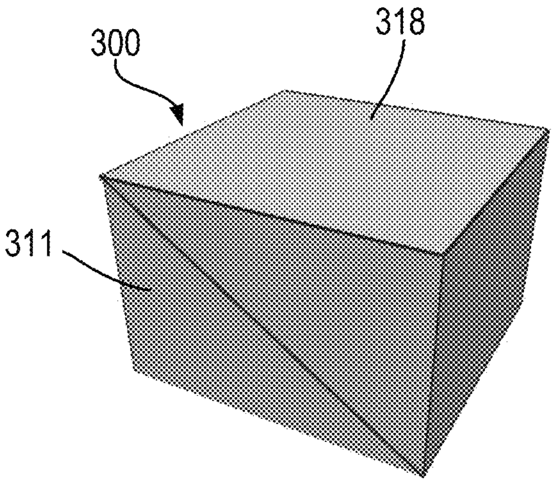
FIG. 4 shows the packaging of FIG. 3, with the outer box in a closed position.

When the outer box 310 is in a closed position, for example, as shown in FIG. 4, the lid 318 receives the one or more sidewalls 313 at an open end of the housing 311, and holds the flap 317 against the first edge 314 and the second edge 315, enclosing the one or more sidewalls 313. In some embodiments, the flap 317 does not fully enclose the one or more sidewalls 313. The outer box 310 may be in a closed position during transport, or may be in a closed position to safely store the containers 200. The outer box 310 may also be in an open position, for example, as shown in FIGS. 1-2. In the open position, the lid 318 is in an unengaged position, thus allowing for the flap 317 to be in an unfolded position. When the lid 318 and the flap 317 are disengaged, the flap 317 swings downwardly towards the bottom panel 312 and exposes the open segment between the first edge 314 and the second edge 315. The outer box 310 may be in an open position during preparation or administration of the medication. The outer box 310 may also be in an open position during loading of the packaging 300 with the containers 200. In some embodiments, the lid 318 is coupled to one sidewall 313 of the housing 311 along a hinge such that the lid 318 rotates about the hinge to move the outer box 310 between the closed position and the open position.

Figure 12:
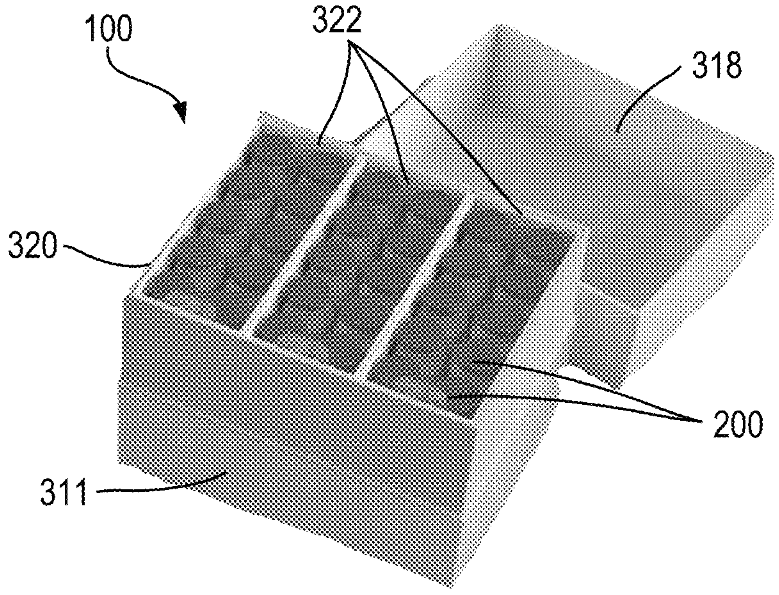
FIG. 12 shows the dose container of FIG. 11, with the outer box in an open position.

The at least one tray assembly 320 is received within the housing 311, and is configured to contain the containers 200. For example, the at least one tray assembly 320 can be placed into (e.g., inserted into) the housing 311. In some embodiments, for example, as shown in FIG. 2, the at least one tray assembly 320 may include a plurality of tray assemblies (e.g., 2, 3, 4, 5, 6, 7, 8, 9, 10, etc.) stacked vertically within the housing 311. In some embodiments, for example, as shown in FIG. 12, the at least one tray assembly 320 may include a plurality of tray assemblies (e.g., 2, 3, 4, 5, 6, 7, 8, 9, 10, etc.) placed side-by-side within the housing 311. In some embodiments, the at least one tray assembly 320 may include a plurality of tray assemblies stacked horizontally within the housing 311. In some embodiments, the at least one tray assembly 320 is modular, allowing a single tray assembly design to be used across various unit doses, which may be provided in boxes of different heights. In some embodiments, the at least one tray assembly 320 is reusable (e.g., to store unused containers 200 following an initial administration session), and can be reused in housing 311 of different sizes.

When the outer box 310 is in the open position, the at least one tray assembly 320 is removable from the outer box 310. The at least one tray assembly 320 can be removed to prepare and administer the containers 200. In some embodiments, the at least one tray assembly 320 can be removed and used as a carrier. For example, the at least one tray assembly 320 may be removed to thaw the containers 200 in an upright position without additional handling, such as repackaging into another container or device. In some embodiments, the at least one tray assembly 320 may be removed to visually inspect the containers 200 for particulate matter or discoloration prior to administration. In some embodiments, the at least one tray assembly 320 is a slide-out tray. The at least one tray assembly 320 is configured to slide out of the outer box 310 through the open segment and over the flap 317. The flap 317 acts as a "draw bridge" to allow easier removal of a given tray assembly 320, particularly with multiple tray assemblies 320 stacked. In some embodiments, the at least one tray assembly 320 may be lifted out of the outer box 310. In some embodiments, an envelope assembly 330 is provided within the outer box 310, such as behind the at least one tray assembly 320, and contains supplies and/or printed material associated with the medication.

Figure 5:
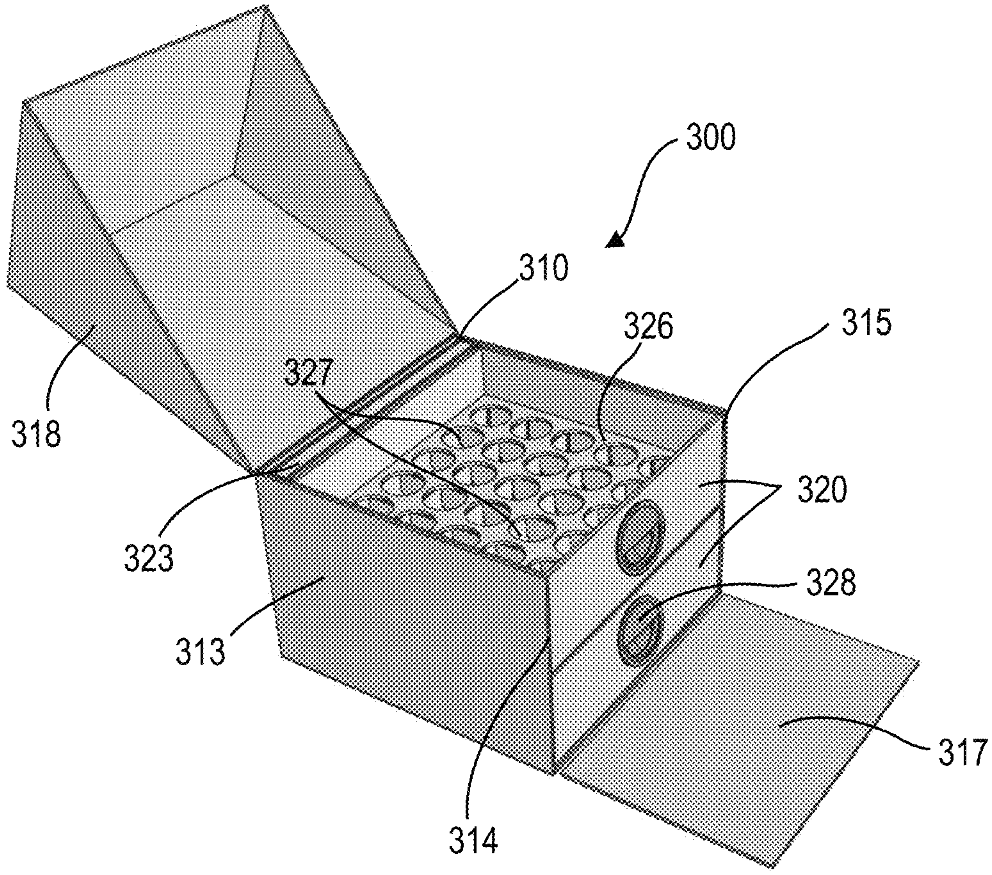
FIG. 5 shows the packaging of FIG. 3, with the outer box in an open position.
Figure 6:
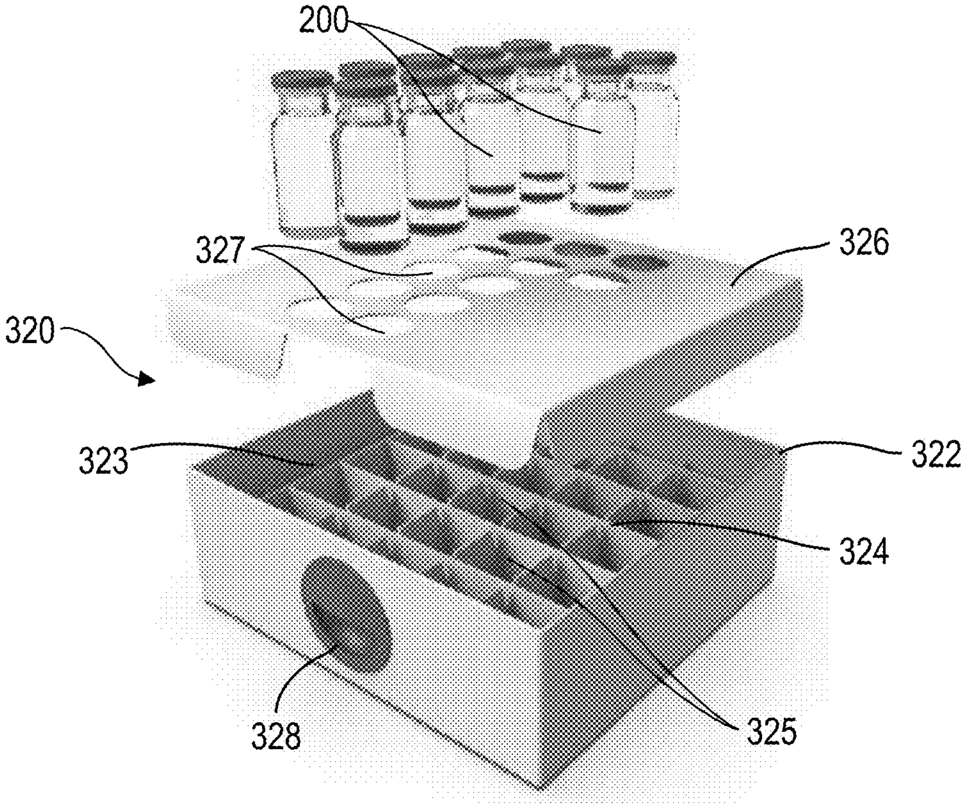
FIG. 6 shows an exploded view of a tray assembly of a dose container holding single-dose containers, according to one embodiment.
Figure 7:
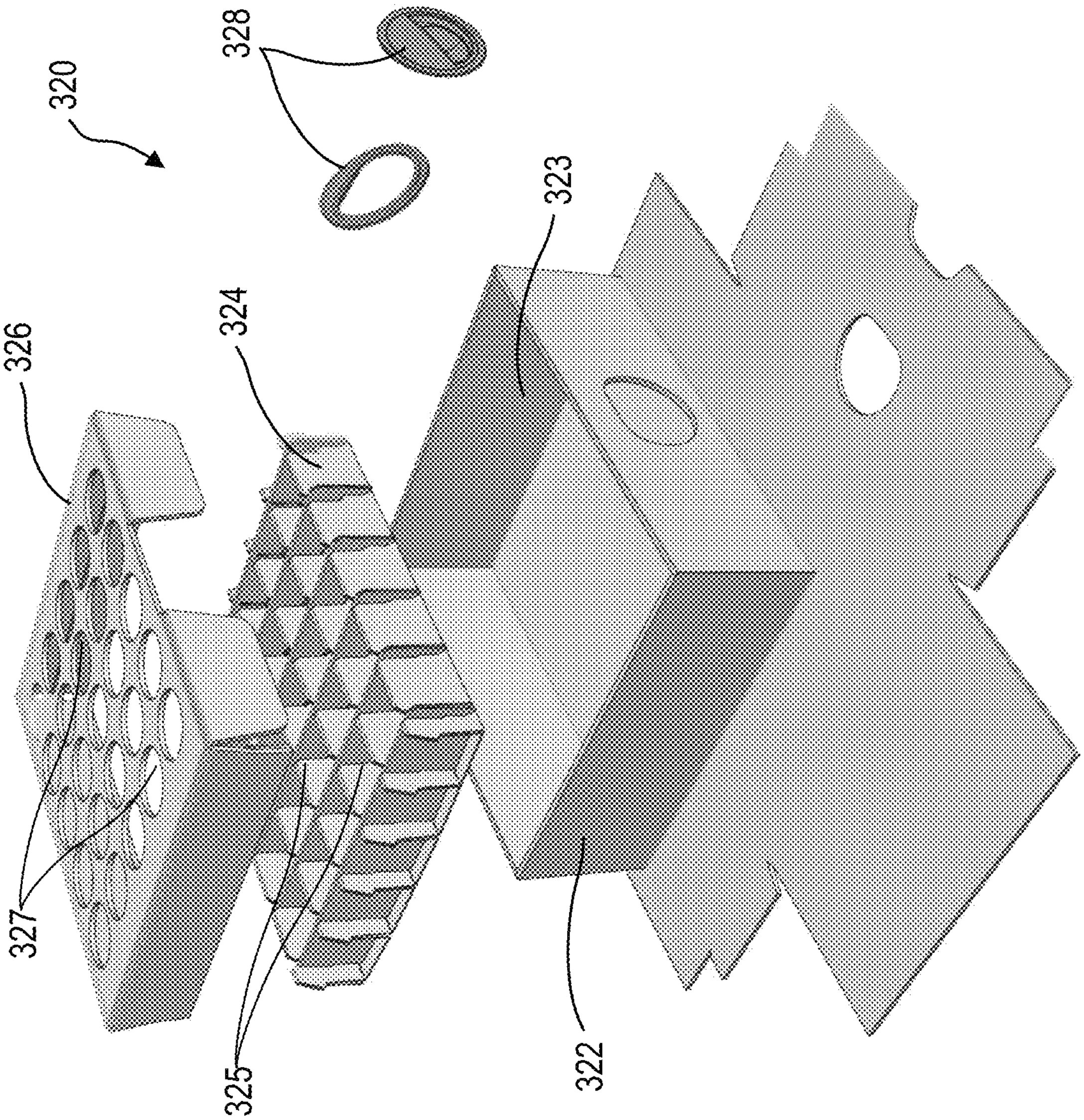
FIG. 7 shows an exploded view of a tray assembly of a dose container, according to one embodiment.

Referring to FIGS. 5-7, the at least one tray assembly 320 includes a tray 322, a support 324, and a cover sheet 326. The at least one tray assembly 320 is configured to securely hold and organize the containers 200. The tray 322 defines an interior region 323. In some embodiments, the dimensions of the tray 322 may be tailored to accommodate different medication regimens, administration protocols, or shipping requirements, or any combination thereof. A support 324 is disposed within the interior region 323 and partitions the interior region 323 into a number of slots 325. In some embodiments, the support 324 is an assembly of multiple components. In some embodiments, the support 324 is integrally formed. The number of slots 325 is greater than or equal to the predetermined number of containers 200. In some embodiments, the support 324 may be easily reconfigured to partition the interior region 323 into a range of numbers of slots 325. In some embodiments, the tray 322 is reusable, and can be used to aid in handling the containers 300 during a preparation process.

The cover sheet 326 is disposed within the interior region. In some embodiments, the cover sheet 326 includes mechanical interlocking features, such as bumpers, to facilitate coupling the cover sheet to the support 324 and/or the tray 322. In some embodiments, the interlocking features are coupled to the cover sheet 326 via adhesive. In some embodiments, the cover sheet and interlocking features are formed integrally. In some embodiments, the cover sheet 326 is coupled to the support 324 and/or the tray 322 via an adhesive. The cover sheet 326 includes a main sheet overlaying the support 324 and a predetermined number of openings 327 corresponding to the predetermined number of containers 200. The openings 327 extend through the main sheet to expose a respective slot 325, thus allowing the slot 325 to receive a container 200. In some embodiments, each of the openings 327 receive one container 200. In some embodiments, an additional seal or, foil backing, or peelable layer, is disposed above each of the openings 327 to provide additional security and protection. In some embodiments, the cover sheet 326 includes contrasting colors to distinguish various regions on a top surface of the cover sheet 326.

In some embodiments, the openings 327 are arranged in rows, providing symmetry/regularity and uniform sizing and spacing, to aid in visual counting of the containers 200. For example, in some embodiments, the openings 327 are arranged in rows of five in a layout forming a grid or lattice. In some embodiments, the openings 327 are arranged in rows of less than five in a layout forming a grid or lattice. In some embodiments, the openings 327 are arranged in a layout forming a radial pattern. In some embodiments, the openings 327 are arranged in a layout forming a regular pattern.

In some embodiments, the configuration of openings 327 on the cover sheet may be customized based on healthcare professional preference, specific medication regimens, storage requirements, and workflow preferences. The cover sheet 326 may be customized to hold a range of container quantities (e.g., 1, 2, 3, 4, 5, 6, 7, 8, 9, 10, 11, 12, 13, 14, 15, 16, 17, 17, 19, 20, 21, 22, 23, 24, 25, etc.) within the interior region 323, allowing the at least one tray assembly 320 to be used in various dosage units. For example, the cover sheet 326 in the at least one tray assembly 320 may be removed and replaced with a different cover sheet 326 configured to hold a different number of containers 200. In the event of changing needs, or production changes, the at least one tray assembly 320 can be easily reconfigured and adapted to accommodate a different number of containers 200. In some embodiments, the at least one tray assembly 320 is reusable, and can be reconfigured for different applications by changing the support 324 and/or the cover sheet 326.

In some embodiments, the cover sheet 326 is formed by cutting a customized configuration of openings 327 into a main sheet that is standard (e.g., common, shared, etc.) for all dosages. Therefore, one standard main sheet can be used across a range of dosages to form the cover sheet 326, reducing the number of packaging components needed. Further, one standard main sheet can be used to provide various arrangements of the openings. For example, the standard main sheet may be cut to provide an arrangement of openings in rows of five, or, may be cut to provide an arrangement of openings in a circular pattern. In some embodiments, the cover sheet 326 can provide customizable configurations to meet the specific needs and preferences of healthcare professionals and facilities.

In some embodiments, the openings 327 are die cut into the cover sheet 326. The openings 327 can be created in a variety of ways, e.g., die cut, perforation, etc. In some embodiments, the openings 327 are perforated starburst patterns cut into the cover sheet 326. Each of the openings 327 align with a slot 325 and hold one container 200. In some embodiments, each of the openings 327 hold more than one container 200. In some embodiments, the openings 327 include a secure locking mechanism, or retention feature, to prevent single-dose containers from shifting or dislodging during handling and transportation. In some embodiments, the openings 327 include snap-fit connections, or interlocking features. In some embodiments, a depth of a container 200 extends into the interior region 323. The containers 200 are received within the slots 325 and the openings 327. As the openings 327 in the cover sheet 326 align with the slots 325, the openings 327 expose at least a subset of the slots 325. In some embodiments where the at least one tray assembly 320 includes two or more tray assemblies, the cover sheet 326 in one tray assembly may have a different predetermined number of openings 327, or a different configuration of openings 327 than the cover sheet 326 in another tray assembly.

In some embodiments, the number of slots 325 exceeds the predetermined number of openings 327. For example, the number of slots 325 can be greater than the predetermined number of openings 327 by two or more, leaving some slots 325 covered by the cover sheet 326. Slots 325 not exposed by an opening 327 in the cover sheet 326 remain empty and do not hold a container 200. Empty slots are covered and no longer visible to a user, reducing the presence of distractions that may influence the accuracy of visual counting. Further, empty slots are configured to be adjacent to one another (e.g., grouped, clustered, etc.), facilitating more accurate and efficient visual counting, and providing improved visibility and access to the containers 200. Grouping empty slots provides a visual cue that facilitates rapid recognition. In some embodiments, empty slots are arranged around a perimeter of the tray 322 to provide an air gap protecting the containers 200.

The arrangement of the slots 325 in the support 324 with the openings 327 in the cover sheet 326 provide a number of design features that facilitate subitizing, the quick and accurate identification of a number of things in a set by glancing at them, rather than counting them. As discussed above, the arrangement of the slots 325 in rows (e.g., in rows of five in a grid or lattice layout) in the support 324 ensures consistent size and spacing, arranges the slots 325 in rows/columns/arrays of a typical quantity for subitization (generally, up to five), and provides a symmetrical arrangement, aiding in visual organization that makes it easier to perceive and process quantities without counting. Therefore, a healthcare professional can quickly and easily identify a quantity of containers 200 in a dosage unit 100 throughout the preparation and administration of the drug, such as confirming that the dosage unit 100 includes a sufficient number of containers 200.

In some embodiments, the at least one tray assembly 320 further includes a handle 328 coupled to an exterior side of the at least one tray assembly 320. In some embodiments, the handle 328 is adjacent to the flap 317 when the outer box is in the closed position. In some embodiments, the handle is a grommet inserted in a hole in the tray 322, as shown in FIG. 7. In some embodiments, the grommet includes a surface extending downwardly from an edge of the grommet to cover a portion of the hole, providing a grasping surface for a user.

Figure 8:
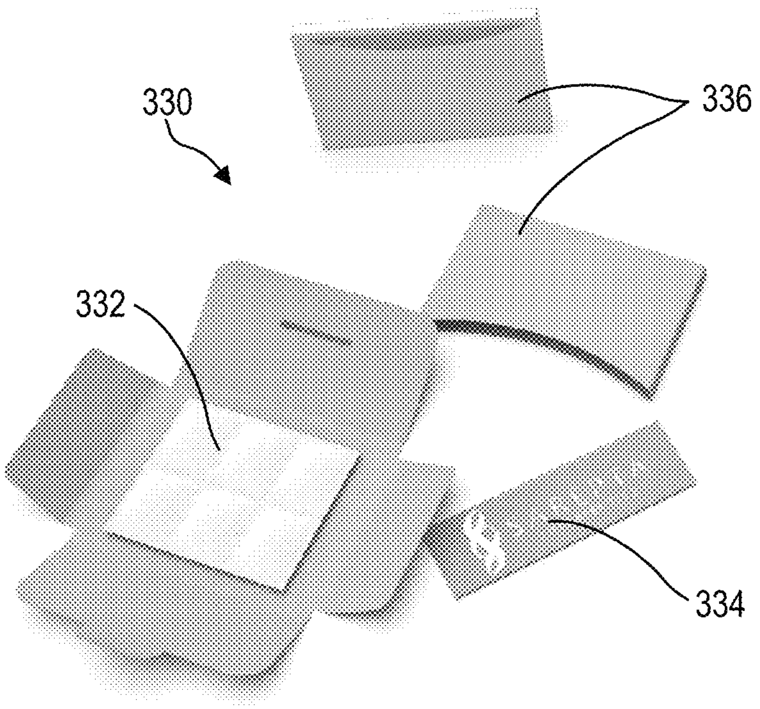
FIG. 8 shows an envelope assembly for a dose container, according to one embodiment.
Figure 9:
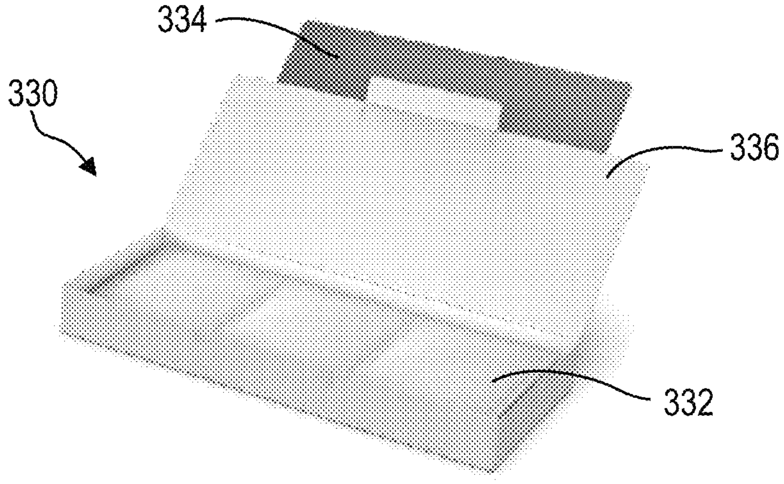
FIG. 9 shows an envelope assembly for a dose container, according to one embodiment.

In some embodiments, the packaging 300 further includes an envelope assembly 330. Referring to FIGS. 8-9, the envelope assembly 330 includes an envelope 336, alcohol swabs 332 disposed within the envelope 336, and an insert 334 disposed within the envelope 336. In some embodiments, the envelope 336 may include an outer sleeve and a carton holding the alcohol swabs 332, for example, as shown in FIG. 8. In some embodiments, a number of alcohol swabs 332 corresponds to the predetermined number of containers 200. In some embodiments, the envelope 336 is a hinged paperboard box, for example, as shown in FIG. 9. In some embodiments, the insert is inserted into an exterior compartment of the envelope 336. In some embodiments, the insert 334 includes dosage and administration instructions associated with the dosage unit 100. In some embodiments, the insert 334 includes product information such as potential adverse drug reactions and interactions, storage conditions, and expiration date. In some embodiments, the envelope assembly 330 may include additional supplies or devices associated with administering the drug (e.g., syringes, droppers, transdermal delivery systems, pumps, aerosol sprays, gauze, etc.).

Figure 10:
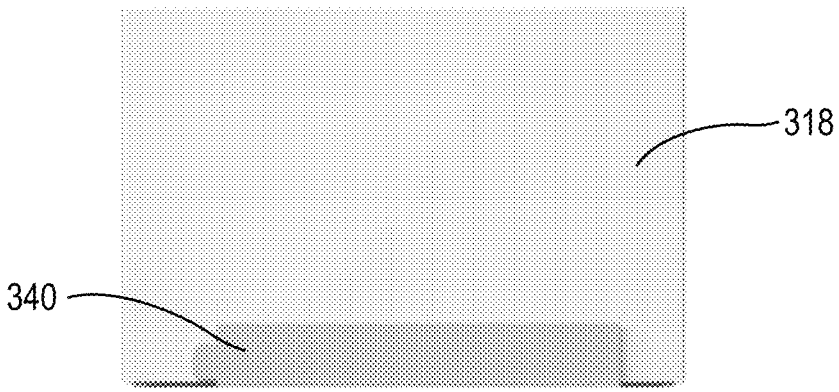
FIG. 10 shows packaging for a dose container including a tear strip, according to one embodiment.
Figure 11:
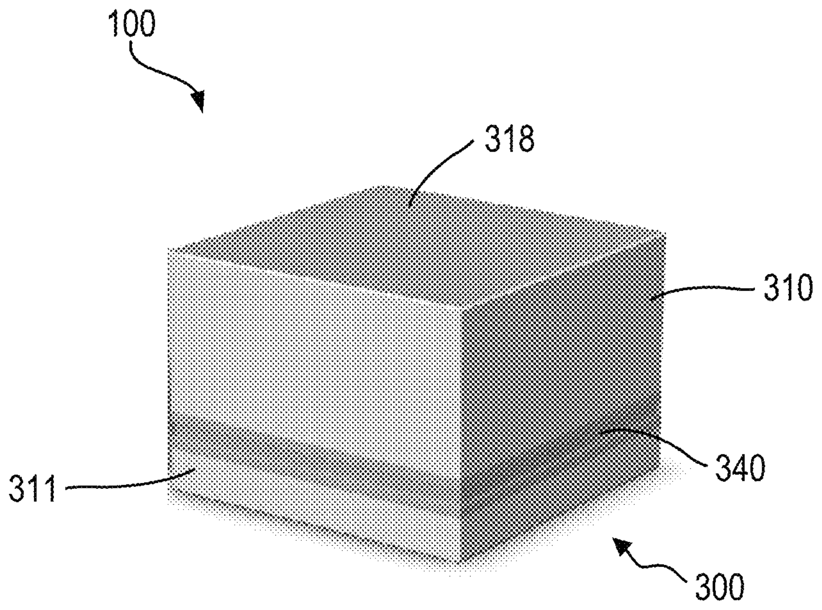
FIG. 11 shows a dose container with an outer box in a closed position, according to one embodiment.

Referring to FIG. 10, in some embodiments, the packaging 300 further includes a perforated tear strip 340 disposed between the lid 318 and the housing 311. In some embodiments, the perforated tear strip 340 is disposed along one bottom edge of the lid 318 aligned with a bottom edge of the housing 311. In some embodiments, the configuration of the lid 318 and the housing 311 is such that the perforated tear strip 340 can seal the outer box 310 in the closed position. Thus, in some embodiments, when the outer box 310 is in the closed position, only a single edge (i.e., the edge where the perforated tear strip 340 is present) is provided with an external seal (i.e., the perforated tear strip 340). That is, the remaining edges may not be provided with any external seal, such as the perforated tear strip 340. In some embodiments, the perforated tear strip 340 includes a tab for a user to grasp and pull away from the outer box 310 to tear the perforated tear strip 340. In some embodiments, the perforated tear strip 340 is aligned with an opening side of the outer box 310. In some embodiments, for example, as shown in FIG. 11, the perforated tear strip 340 is disposed around a perimeter of the outer box 310 between the lid 318 and the housing 311. In some embodiments, for example, as shown in FIG. 13, the perforated tear strip 340 is disposed around a portion of the perimeter of the outer box 310. The perforated tear strip 340 provides a tamper-evident packaging feature, which keeps the packaging closed until it is intended to be opened, and provides a visual cue to healthcare professionals regarding the integrity and authenticity of the medication packaging. In some embodiments, the perforated tear strip 340 protects against incidental and accidental poisoning. In some embodiments, a tamper-evident feature such as shrink wrap, or breakable seals, is incorporated in the packaging 300.

Figure 18:
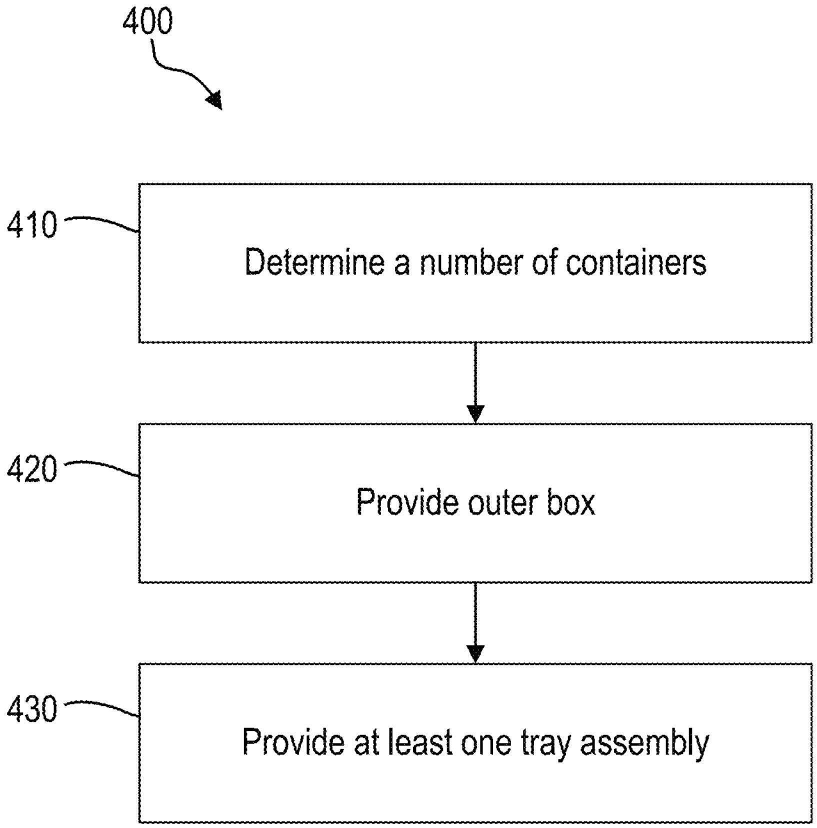
FIG. 18 shows a flow chart of a method of preparing a dose container, according to one embodiment.

FIG. 18 is a flow chart of a method 400 of preparing a dosage unit of a medication. The dosage unit can be any of the dosage units described herein, such as the dosage unit 100 shown in FIGS. 1-2. The method 400 can be used to prepare a dose container for a specific patient, medication, medical condition, or treatment program. In some embodiments, the method 400 can be used to prepare a dose container to hold a unit dose of a medication. The method 400 can be used to package containers of a drug for transport, storage, and organization. The method 400 can be used to prepare a number of containers to be shipped together. The method 400 can be used as a packaging process for a drug administered in single-dose containers.

Step 410 includes providing an outer box. The outer box provided in step 410 may be structurally and/or functionally similar to any of the outer boxes described herein such as the outer box 310 of FIGS. 1-5. The outer box includes a housing and a lid. Providing an outer box may include forming and/or assembling the outer box. For example, the outer box may be formed by coupling (e.g., adhering, securing, fastening, etc.) the lid to the housing. In some embodiments, the outer box is integrally formed. In some embodiments, the housing may be formed of a single sheet having portions that are folded to form the housing.

Step 420 includes providing a tray assembly within a housing of the outer box. The outer box is provided in an open position to receive the tray assembly. The tray assembly includes a tray, a support, and a cover sheet. The tray assembly provided in step 440 may be structurally and/or functionally similar to any of the tray assemblies described herein such as the at least one tray assembly 320 of FIGS. 1-2 and 6-7. Providing a tray assembly may include forming and/or assembling the tray assembly. For example, the tray may be formed of a single sheet having portions that are folded to form the tray, or, the support may be formed by inserting portions of a first component into a second component. In some embodiments, providing the tray assembly includes placing the support into the interior region of the tray, and placing the cover sheet over the support in the interior region of the tray. In some embodiments, the tray and support are provided as a sub-assembly. In some embodiments, the cover sheet may include alignment features (slots, tabs, bumpers, etc.). In some embodiments, multiple cover sheets having different numbers of openings can be placed in the same tray. In some embodiments, step 420 includes providing a first tray assembly in the housing, and stacking an additional (1, 2, 3, etc.) tray assembly on top of the first tray assembly in the housing, such that the tray assemblies are stacked vertically. In some embodiments, providing the tray assembly may include installing a handle on an exterior side of the tray, such as by installing a grommet over a hole on the exterior side of the tray.

In some embodiments, the method 400 can include filling the tray assembly with the predetermined number of single-dose containers. In some embodiments, the method 400 can include placing an envelope assembly including supplies and/or information associated with the medication in the housing, such as behind the tray assembly. In some embodiments, the method 400 can include lifting a flap of the housing to enclose the side walls of the housing around the tray assembly, and placing the lid over the housing such that the outer box is in a closed position. In some embodiments, the method 400 can include placing a perforated tear strip between the lid and the housing.

Definitions

As utilized herein, the terms “approximately,” “about,” “substantially,” and similar terms are intended to have a broad meaning in harmony with the common and accepted usage by those of ordinary skill in the art to which the subject matter of this disclosure pertains. It should be understood by those of skill in the art who review this disclosure that these terms are intended to allow a description of certain features described and claimed without restricting the scope of these features to any particular numerical ranges provided. Given the context in which it is used, “about,” “approximately,” “substantially” and similar terms can mean up to plus or minus 10%, or alternatively 5%, or alternatively 2.5%, of the particular value. Further, these terms should be interpreted as indicating that insubstantial or inconsequential modifications or alterations of the subject matter described and claimed are considered to be within the scope of the disclosure as recited in the appended claims.

All numerical designations, e.g., quantity, dimensions, etc. including ranges, are approximations which are varied (+) or (−) by increments of 1.0 or 0.1, as appropriate, or alternatively by a variation of plus or minus 10%, or alternatively 5%, or alternatively 2.5%. It is to be understood, although not always explicitly stated, that all numerical designations are preceded by the term “about” or “approximately.”

It should be noted that the term “exemplary” and variations thereof, as used herein to describe various embodiments, are intended to indicate that such embodiments are possible examples, representations, or illustrations of possible embodiments (and such terms are not intended to connote that such embodiments are necessarily extraordinary or superlative examples).

The term “coupled” and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If “coupled” or variations thereof are modified by an additional term (e.g., directly coupled), the generic definition of “coupled” provided above is modified by the plain language meaning of the additional term (e.g., “directly coupled” means the joining of two members without any separate intervening member), resulting in a narrower definition than the generic definition of “coupled” provided above. Such coupling may be mechanical, electrical, or fluidic.

Any references herein to the positions of elements (e.g., “top,” “bottom,” “above,” “below”) are merely used to describe the orientation of various elements in the figures. It should be noted that the orientation of various elements may differ according to other exemplary embodiments, and that such variations are intended to be encompassed by the present disclosure.

As used herein, the singular forms "a," "an," and "the" include plural referents unless the context clearly dictates otherwise. Thus, for example, the term "a member" is intended to mean a single member or a combination of members, "a material" is intended to mean one or more materials, or a combination thereof.

It should be noted that the term "exemplary" as used herein to describe various embodiments is intended to indicate that such embodiments are possible examples, representations, and/or illustrations of possible embodiments (and such term is not intended to connote that such embodiments are necessarily extraordinary or superlative examples).

The terms "coupled," "connected," and the like as used herein mean the joining of two members directly or indirectly to one another. Such joining may be stationary (e.g., permanent) or moveable (e.g., removable or releasable). Such joining may be achieved with the two members or the two members and any additional intermediate members being integrally formed as a single unitary body with one another or with the two members or the two members and any additional intermediate members being attached to one another.

It is important to note that the construction and arrangement of the various exemplary embodiments are illustrative only. Although only a few embodiments have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter described herein. Other substitutions, modifications, changes and omissions may also be made in the design, operating conditions and arrangement of the various exemplary embodiments without departing from the scope of the present invention.

While this specification contains many specific implementation details, these should not be construed as limitations on the scope of any inventions or of what may be claimed, but rather as descriptions of features specific to particular implementations of particular inventions. Certain features described in this specification in the context of separate implementations can also be implemented in combination in a single implementation. Conversely, various features described in the context of a single implementation can also be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Although the figures and description may illustrate a specific order of method steps, the order of such steps may differ from what is depicted and described, unless specified differently above. Also, two or more steps may be performed concurrently or with partial concurrence, unless specified differently above.

It is important to note that any element disclosed in one embodiment may be incorporated or utilized with any other embodiment disclosed herein. Although only one example of an element from one embodiment that can be incorporated or utilized in another embodiment has been described above, it should be appreciated that other elements of the various embodiments may be incorporated or utilized with any of the other embodiments disclosed herein.

What is claimed is:

1. A package for a dose, the package comprising:

an outer box, comprising:

a housing, comprising:

a bottom panel;

one or more sidewalls extending upwards from the bottom panel and surrounding a portion of a perimeter of the bottom panel, the one or more sidewalls having a first edge and a second edge defining an open segment in the perimeter of the bottom panel such that the one or more sidewalls form a top opening and a side opening in the housing; and a flap coupled to the perimeter of the bottom panel and spanning the open segment, the flap extending between the first edge and the second edge and enclosing the one or more sidewalls when the outer box is in a closed position such that the flap covers the side opening when the outer box is in the closed position; and a lid coupled to a portion of the one or more sidewalls at an open end of the housing, the lid configured to receive the one or more sidewalls and hold the flap against the first edge and the second edge when the outer box is in the closed position; and at least one tray assembly disposed within the housing when the outer box is in the closed position, the at least one tray assembly comprising:

a tray defining an interior region;

a support disposed within the interior region and partitioning the interior region into a plurality of slots; and a first cover sheet disposed within the interior region, the first cover sheet comprising:

a main sheet overlaying the support; and a first plurality of openings aligned with at least a subset of the plurality of slots extending through the main sheet to allow one or more slots of the subset to receive a container.

2. The package of claim 1, wherein:

a number of the plurality of slots is greater than a number of the first plurality of openings by two or more; and slots of the plurality of slots not aligned with the first plurality of openings are adjacent one another.

3. The package of claim 1, wherein the at least one tray assembly further comprises a handle coupled to an exterior side of the at least one tray assembly.

4. The package of claim 3, wherein the first plurality of openings is arranged in sets of 1-10 openings.

5. The package of claim 1, wherein the first plurality of openings is arranged in a layout forming a grid.

6. The package of claim 1, further comprising an envelope disposed within the housing behind the at least one tray assembly.

7. The package of claim 1, wherein the at least one tray assembly comprises two or more tray assemblies stacked within the housing.

8. The package of claim 7, wherein a tray assembly of the at least one tray assembly comprises a second cover sheet comprising the main sheet and a second plurality of openings, the second cover sheet having at least one of a different number of openings or a different arrangement of openings relative to the first cover sheet.

9. A dose container, comprising:

a predetermined number of containers associated with a prescribable dose; and packaging configured to contain the predetermined number of containers, the packaging comprising:

an outer box, comprising:

a housing, comprising:

a bottom panel;

one or more sidewalls extending upwards from the bottom panel and surrounding a portion of a perimeter of the bottom panel, the one or more sidewalls defining a top opening in the housing and a side opening in the housing; and a flap coupled to the perimeter of the bottom panel and covering the side opening when the outer box is in a closed position; and a lid coupled to the housing proximate the top opening, the lid configured to receive and engage the housing and cover the top opening when the outer box is in the closed position; and at least one tray assembly disposed within the housing when the outer box is in the closed position, and, the at least one tray assembly removable from the housing through at least one of the top opening and the side opening when the outer box is in an open position, the at least one tray assembly comprising:

a tray defining an interior region;

a support disposed within the interior region and partitioning the interior region into a number of slots greater than or equal to the predetermined number of containers; and a first cover sheet overlaying the support within the interior region, the first cover sheet comprising a first predetermined number of openings associated with the predetermined number of containers, a plurality of the openings aligning with respective slots and each opening configured to hold one container.

10. The dose container of claim 9, wherein the containers are vials.

11. The dose container of claim 9, further comprising an envelope assembly disposed within the housing, the envelope assembly comprising:

an envelope; and a number of alcohol swabs disposed within the envelope, the number of alcohol swabs corresponding to the predetermined number of containers.

12. The dose container of claim 11, wherein the envelope assembly further comprises an insert configured to include instructions associated with administration of the prescribable dose.

13. The dose container of claim 9, wherein a tray assembly of the at least one tray assembly is stacked above another tray assembly of the at least one tray assembly.

14. The dose container of claim 9, wherein a tray assembly of the at least one tray assembly comprises a second cover sheet comprising a second predetermined number of openings different from the first predetermined number of openings.

15. The dose container of claim 9, wherein:

the number of slots is greater than the first predetermined number of openings by two or more; and slots not exposed by an opening in the first cover sheet are adjacent one another.

16. The dose container of claim 9, further comprising a perforated tear strip disposed between the lid and the housing.

17. The dose container of claim 9, wherein the at least one tray assembly further comprises a handle coupled to an exterior side of the at least one tray assembly.

18. A method of storing a dose in a dose container, comprising:

determining a number of containers corresponding to a prescribable dose;

providing an outer box, the outer box comprising:

a housing, comprising:

a bottom panel;

one or more sidewalls extending upwards from the bottom panel and surrounding a portion of a perimeter of the bottom panel, the one or more sidewalls having a first edge and a second edge defining an open segment in the perimeter of the bottom panel such that the one or more sidewalls form a top opening and a side opening in the housing; and a flap coupled to the perimeter of the bottom panel and spanning the open segment, the flap extending between the first edge and the second edge and enclosing the side wall when the outer box is in a closed position such that the flap covers the side opening when the outer box is in the closed position; and a lid coupled to a portion of the one or more sidewalls at an open end of the housing, the lid configured to receive the one or more sidewalls and hold the flap against the first edge and the second edge when the outer box is in the closed position; and placing at least one tray assembly within the housing, the at least one tray assembly comprising:

a tray defining an interior region;

a support disposed within the interior region and partitioning the interior region into a number of slots greater than or equal to the number of containers for providing the prescribable dose, the slots arranged in rows; and a cover sheet disposed within the interior region and overlaying the support, the cover sheet comprising a number of openings corresponding to the number of containers corresponding to the prescribable dose, at least one of the openings aligning with a slot and configured to hold one container, the openings exposing at least a subset of the slots.

19. The method of claim 18, wherein:

the number of slots is greater than the number of openings by two or more; and slots not exposed by an opening in the cover sheet are adjacent one another.

20. The method of claim 18, further comprising providing an envelope within the housing.

* * * * *